United States Patent
Brun et al.

[19]

[11] Patent Number: 5,922,955
[45] Date of Patent: Jul. 13, 1999

[54] GRAVITY-COMPENSATION TYPE ACCELEROMETER AND PROCESS FOR PRODUCING SUCH AN ACCELEROMETER

[75] Inventors: Jean Brun, Champagnier; Stéphane Caplet, Seyssinel; Patricia Touret, Echirolles; Gérard Ruzie, Dourdan, all of France

[73] Assignee: Commissariat A L'Energie Atomique, Paris, France

[21] Appl. No.: 08/776,845

[22] PCT Filed: Jun. 13, 1996

[86] PCT No.: PCT/FR96/00904

§ 371 Date: Feb. 13, 1997

§ 102(e) Date: Feb. 13, 1997

[87] PCT Pub. No.: WO97/00451

PCT Pub. Date: Jan. 3, 1997

[30] Foreign Application Priority Data

Jun. 14, 1995 [FR] France .................................. 95 07077

[51] Int. Cl.⁶ ...................................................... G01P 15/00
[52] U.S. Cl. ........................................................ 73/514.01
[58] Field of Search ........................... 73/514.01, 514.24, 73/514.35, 514.36, 514.38, 862.381, 862.61, 862.471, 862.473, 862.391, 514.34, 514.21; 216/2; 438/50, 52; 310/329

[56] References Cited

U.S. PATENT DOCUMENTS

| | | | |
|---|---|---|---|
| 3,673,442 | 6/1972 | Sonderegger | 310/329 |
| 3,893,342 | 7/1975 | Florian et al. | 73/514.34 |
| 4,494,409 | 1/1985 | Kondo et al. | |
| 5,129,983 | 7/1992 | Greiff . | |
| 5,134,881 | 8/1992 | Henrion et al. | 73/514.35 |
| 5,209,117 | 5/1993 | Bennett . | |
| 5,241,864 | 9/1993 | Addie et al. | |

FOREIGN PATENT DOCUMENTS

A37 40 688  6/1989  Germany .

WOA89 12830  12/1989  WIPO .

OTHER PUBLICATIONS

Sumitomo Electric Technical Review, No. 38, Jun. 1994, Development of Micromachined Silicon Accelerometer, Minoru Ueda, et al. pp. 72–77.

Spie vol. 2220, pp. 15–26, Small Inertial Measurement Units–Sources of Error and Limitations on Accuracy, Michael E. Hoenk.

IOP Publishing Ltd. (1988), pp. 943–947, The Effects of Spring and Magnetic Distortions on Electromagnetic Geophones, Shi Jung Chen, et al.

Bulletin of the Seismological Society of America, vol. 72, No. 6, pp. 2349–2367, Dec. 1982, The Leaf–Spring Seismometer: Design and Performance, E. Wielandt, et al.

Sensors and Actuators, A.36 (1993) pp. 227–231, Application of Oxygen Plasma Processing to Silicon Direct Bonding, O. Zucker, et al.

La Revue de Metallurgie–CIT/Science et Genie des Materiaux, Sep. 1993, p. 1109, Maniguet, et al., Analyse par diffraction des rayons X, de l'evolution des contraintes residuelles associee a la gravure de iignes dans un depot mince de tungstene CVD sur substrat de Si.

(List continued on next page.)

*Primary Examiner*—Hezron Williams
*Assistant Examiner*—Richard A. Moller
*Attorney, Agent, or Firm*—Oblon, Spivak, McClelland, Maier & Neustadt, P.C.

[57] ABSTRACT

An accelerometer includes a seismic mass which is subjected to a force when accelerated. The seismic mass is connected to a support by a mechanical connection which can bend under the influence of the force. A detector is provided to determine the acceleration induced in the seismic mass by the force. Compensation can be provided for the force exerted on the mass due to gravity. The mechanical connection includes at least one component which provides compensation and induces in the mechanical connection a prestress counteracting the force exerted on the mass by gravity.

16 Claims, 2 Drawing Sheets

OTHER PUBLICATIONS

Materials Science Forum vols. 133–136, (1993)pp. 873–878, Internal Stress Tensor Determination in Molybdenum and Molybdenum–Carbon Thin Films Deposited by D.C. Magnetron Sputtering, P. Gergaud, et al.

Thin Solid Films, 40 (1977) pp. 355–363, Internal Stresses in Sputtered Chromium, D.W. Hoffman, et al.

J. Appl. Phys. 66 (10), Nov. 15, 1989, pp. 4715–4718, Parallel Stress and Perpendicular Strain Depth Distributions in [001] Silicon Amorphized by Ion Implantation, R. Fabbri, et al.

Sensors and Actuators A, vol. A 37/38, Jun. 1, 1993, pp. 86–90, Vergote, et al., A Composite Membrane Movement Detector With Dedicated Interface Electronics for Animal Activity Tracking.

GRAVITY-COMPENSATION TYPE ACCELEROMETER AND PROCESS FOR PRODUCING SUCH AN ACCELEROMETER

BACKGROUND OF THE INVENTION

1. Field of the Invention

The present invention relates to a gravity-compensation type accelerometer. Compensating for the effect of gravity on the seismic mass of an accelerometer gives increased sensitivity to variations in acceleration.

The invention applies particularly to small apparatuses. The nature of the accelerometer makes it suitable for construction using mechanical, micromechanical or microelectronics techniques (for example micromachining).

The main field of application for an accelerometer using the present invention is for studying the movement or behavior of milieus subject to gravity (for example seismology).

2. Discussion of the Background

The invention thus makes it possible to design gravity-compensation accelerometers where known types of one-piece accelerometer do not allow for this compensation. Accelerometers using known techniques are described in, for example, M. Ueda, H. Inada, Y. Mine and K. Sunago: "Development of micromachined silicon accelerometer" in the Sumitomo Electric Technical Review, No. 38 of June 1994, pages 72–77 and in Michael E. Hoenk: "Small inertial measurements units-sources of error and limitations on accuracy" in the review SPIE, vol. 2220, pages 15–26.

The most common method for measuring acceleration consists in not directly measuring the acceleration itself but rather the force F applied to a mass M due to the effect of the acceleration γ in question. According to the basic law of motion F=M.γ, if the value of M is known, F can be measured and a value for the acceleration obtained.

The most common type of acceleration sensor thus consists of an inert, or seismic, mass, generally supported by one or more springs. When the mass is subjected to variations in acceleration, it moves and the springs are distorted. The system returns to its initial position as soon as the force due to the acceleration is canceled.

A horizontal acceleration sensor in the rest state is not sensitive to any disruptive effect. On the other hand, a vertically-sensitive accelerometer is subject to a minimum force equivalent to that of gravity, F=M.g, where g is the gravitational constant.

This minimum force due to gravity is inconvenient when attempting to measure very slight vertical accelerations (less than $10^{-6}$ G). It is therefore important in this situation to compensate for the effort due to gravity with a force tending in the opposite direction to that exerted by gravity. At the present time there are two classes of processes for compensating for the force of gravity:

- processes using a source of electric power. An electromagnetic or electrostatic field maintains the seismic mass in suspension. Such processes require complex servo systems,
- processes using the return force of a spring. The mass is maintained in a state of equilibrium, suspended by a pre-distorted spring.

There are also hybrid systems that use a combination of electrostatic or electromagnetic forces together with the return force of a spring. An example of this type of system is described in Shi Jung Chen and Kuan Chen: "The effects of spring and magnetic distortions on electromagnetic geophones" in J. Phys. E. Sci. Instrum. 21 (1988), pages 943–947.

These techniques have other disadvantages.

In electrostatic or electromagnetic apparatuses, the presence of an electronic servo system can generate interference noise that is incompatible with the desired sensitivity. Moreover, purely electrostatic compensation methods produce unstable systems that are difficult to servo-control.

Vertically-sensitive sensors where the effect of gravity on the seismic mass is compensated for by a spring are currently produced by assembling a variety of mechanical parts. This type of sensor is described in, for example, E. Wielandt and G. Streckeisen: "The leaf-spring seismometer: design and performance" in Bulletin of Seismological Society of America, Vol. 72 No. 6; pages 2349–2367, December 1982. By virtue of their construction, this type of apparatus does not have a very high Q quality factor. This structural parameter is related to the density of Brownian noise S of the apparatus using the following relation:

$$s = \sqrt{\frac{4 k_b T \omega_\gamma}{MQ\left[(\omega^2 - \omega_\gamma^2)^2 + \frac{\omega^2 \omega_\gamma^2}{Q^2}\right]}}$$

where:
- ω=pulse
- $\omega_\gamma$=resonance pulse
- $k_b$=Boltzman constant
- T=temperature
- M=mass of seismic mass For more information on this relation, please refer to the article "Small inertial measurements units-sources of error and limitations on accuracy" cited above. The relation shows that S is inversely proportional to Q and M.

To preserve levels of Brownian noise that do not disrupt measurement, present apparatuses have a significant mass M. However, this solution limits miniaturization of the assembly. Of accelerometers with the best performance characteristics (for example, those capable of detecting variations of a few nano-G below 1 G), the smallest weigh several kilograms and have volumes measured in tens of cubic centimeters.

In conclusion, vertically-sensitive accelerometers are either very insensitive or are heavy and bulky. Miniaturization of a high-performance device would require a reduction in size of the seismic mass to increase the quality factor. This may be achieved by using a material with a high quality factor such as, for example, mono-crystalline silicon for manufacturing the sensor assembly. However, building a compact apparatus that includes a spring fastened to the seismic mass presents some technical difficulties. In practice it is difficult to fasten small mechanical parts such as the spring and the seismic mass to one another using mechanical means such as screws or cement without creating areas where internal friction is significant, causing damping phenomena prejudicial to the quality factor. Moreover, the spring must retain a high degree of flexibility since this flexibility influences the sensitivity of the sensor.

SUMMARY OF THE INVENTION

The technique for compensating for the effect of gravity used in the present invention is related to the group of sensors in which the seismic mass is supported by a spring. This solution has the advantage of reducing the noise interference produced by the servo systems required by other types of apparatus. The proposed compensation technique is based on the principle of a leaf spring produced by prestressing one surface of a component (for example a strut) bearing the seismic mass.

The invention therefore relates to an accelerometer comprising a seismic mass capable of being subjected to a force induced by the acceleration to be measured, the seismic mass being fastened to a support by mechanical connecting means capable of bending under the influence of said force, means of detection being provided to determine the acceleration induced in the seismic mass by the force, means of compensation also being provided to compensate for the force exerted on the seismic mass by gravity, characterized in that the mechanical connecting means include at least one component constituting said means of compensation and inducing in such mechanical connecting means a prestress that counteracts the force exerted on the seismic mass by gravity.

The means for compensating for the force exerted on the seismic mass by gravity may consist of a surface layer applied to the mechanical connecting means, this surface layer being applied to one surface of the mechanical connecting means such that it counteracts the force exerted on the seismic mass by gravity and consisting of a material having the properties required to exert stress on said mechanical connecting means.

For these purposes said material exerting the stress may be selected from the group of materials consisting of chromium, molybdenum, tungsten, an alloy thereof or a PZT-type ceramic.

The means for compensating for the force exerted on the seismic mass by gravity may consist of two surface layers applied to two surfaces of the mechanical connecting means, one surface layer consisting of a material that induces a tensile stress and the other layer inducing a compressive stress, the combination of these two layers inducing a stress gradient in the thickness of the mechanical connecting means that counteracts the force exerted on the seismic mass by gravity.

In this case, the two layers may consist of thin films of molybdenum applied using different techniques to produce contrary stresses.

In a different embodiment, the means for compensating for the force exerted on the seismic mass by gravity may consist of modifying the surface of the mechanical connecting means inducing said prestress in the mechanical connecting means.

This surface modification may advantageously consist of doping the surface of the material constituting the mechanical connecting means.

Since the mechanical connecting means in this situation are made of mono-crystalline silicon, one of the surfaces of the mechanical connecting means may be doped using a dopant selected from the group of materials consisting of phosphorus, boron, xenon, titanium, arsenic and argon.

Surface doping may be carried out on opposite surfaces of the mechanical connecting means, each surface being doped with a different dopant, one of which induces a elongation stress while the other induces a compressive stress resulting by inducing a stress gradient in the thickness of the mechanical connecting means that counteracts the force exerted on the seismic mass by gravity.

If the mechanical connecting means are made of silicon, one surface of the mechanical connecting means may be doped with boron while-the other surface is doped with argon.

The mechanical connecting means may consist of one or more struts.

This type of design makes it possible to build the seismic mass, the mechanical connecting means and the support as a single assembly. In contrast with one-piece accelerometers constructed using known techniques, the invention therefore makes it possible to build a one-piece gravity-compensation type accelerometer.

The invention therefore also covers a process for manufacturing an accelerometer comprising a seismic mass connected to a support by mechanical connecting means capable of bending under the effect of a force induced in the seismic mass by the acceleration to be measured, means of compensation also being provided to compensate for the force exerted on the seismic mass by gravity, characterized by the following steps:

masking of one of the main surfaces of a substrate, the first surface, to delimit the seismic mass and the support, engraving the first surface of the substrate in the direction of the other main surface of the substrate, the second surface, leaving a membrane between the bottom of the engraving and the second surface, this engraving delimiting the seismic mass and the support, masking the second face of the substrate in such a way as to mask the support, the seismic mass and the mechanical connecting means, engraving the second surface of the substrate to open unmasked areas of the membrane, processing at least part of the surface of the mechanical connecting means to induce a prestress counteracting the force exerted on the seismic mass by gravity, thereby constituting said means of compensation.

BRIEF DESCRIPTION OF THE DRAWINGS

The invention will be described below in more detail. The other characteristics and advantages disclosed in the following description are given as examples and are not intended to be limiting. The description refers to the attached drawings, in which.

DESCRIPTION OF THE PREFERRED EMBODIMENTS

In the following description, accelerometers will be described that include a seismic mass that is distinct from the component connecting it to a support, this connecting component consisting of one or more struts. This is not restrictive on the invention which applies equally where the seismic mass is not different from the strut or is part of the strut.

Figure 1:
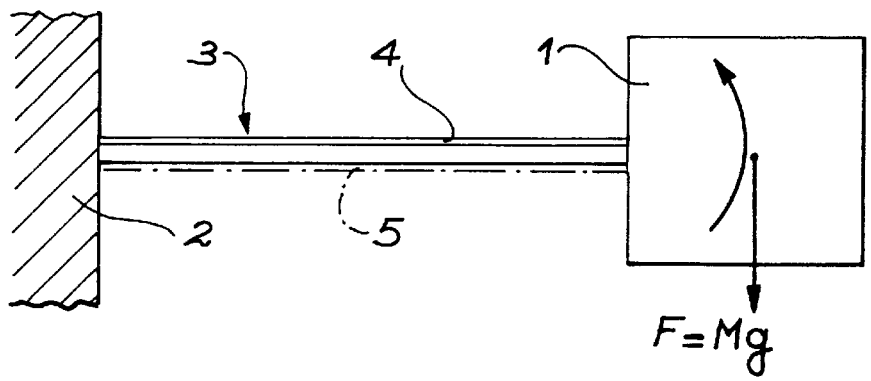
FIG. 1 is a side view of a gravity-compensation type accelerometer built according to a first variant of the invention.

FIG. 1 is a simplified illustration of the principle of the invention as applied to a vertically-sensitive accelerometer.

It shows a seismic mass 1 of mass M connected to a support 2 by means of a strut 3. The seismic mass 1 is thus overhanging in relation to support 2. Overlooking the mass of strut 3, the center of gravity of seismic mass 1 is sensitive to force F to which the seismic mass is subjected following an acceleration g.

To compensate for the effect of gravity on seismic mass 1, the upper surface 4 of strut 3 is processed to induce a prestress which causes a force to be exerted on the seismic mass that compensates for the force induced on the seismic mass by gravity.

This surface stressing of the strut can be obtained in various ways. It may be obtained by depositing a thin film on the surface of the strut or by modifying the surface of the strut significantly enough to produce an effect of stress. The strut thus processed tends to bend, exerting a force opposed to that of gravity. The stress conditions must be such that the end of the strut exerts an upward compensating force as shown by the curved arrow in FIG. 1. If the stress is sufficiently intense, this force counteracts the force of gravity.

Where a layer is deposited on the strut, the deposited material chosen must be a metal or metal alloy or a material known for presenting stresses such as certain piezoelectric materials such as the ceramic described by the formula $Pb(Zr_xTi_{1-x})O_3$ also known as PZT. The preferred materials are chromium, molybdenum, tungsten or an alloy of one of these metals.

Modifying the strut is understood to mean using suitable means to modify the surface area of the material constituting the strut itself. This means may be by doping the surface of the strut to a minimal depth. In this situation it is advantageous to select a dopant suitable for the material constituting the strut in order to obtain a bimetallic strip effect between the doped and undoped sections of the strut. If the strut is made of mono-crystalline silicon, one of the following elements can be used as the dopant phosphorus, boron, xenon, titanium, arsenic or argon.

The solution proposed by the invention thus makes it possible to design a spring connected to the seismic ass forming an assembly that can be small in size without having to resort to mechanical connecting means made up of separate components.

FIG. 1 illustrated the simplest version of an accelerometer, i.e. having only one strut. The invention nevertheless applies to accelerometers having several struts.

The principle of the invention may be applied to accelerometers having two, four or eight struts to limit the degree of freedom (in translation and in rotary motion around the center of gravity) of the vertically displaceable seismic mass. In these embodiments such struts are arranged in opposing pairs or opposing groups of four.

Figure 2:
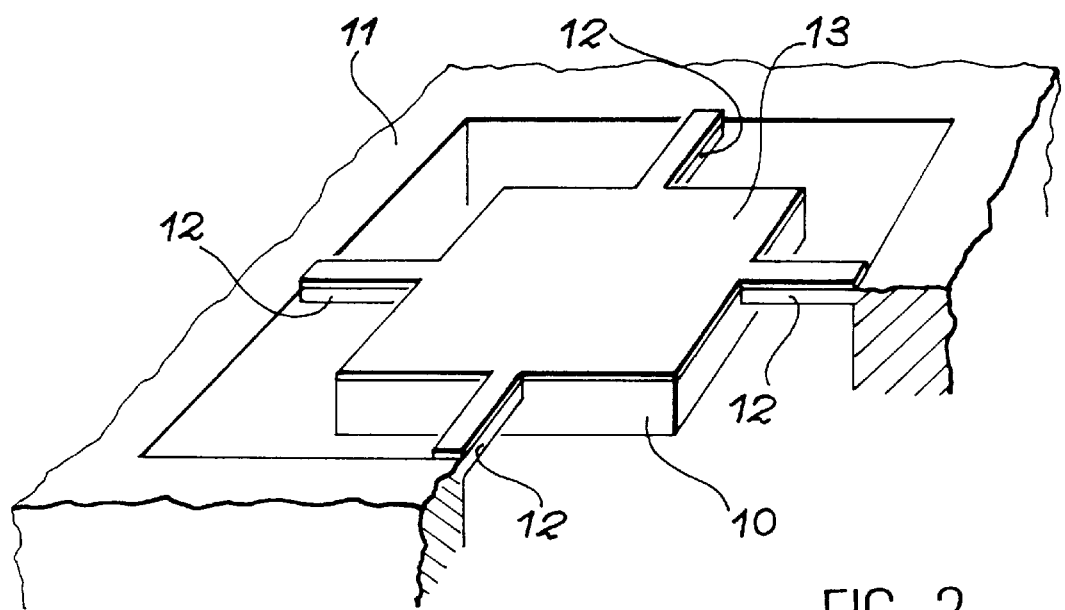
FIG. 2 is a partial perspective view of a gravity-compensation type accelerometer built according to a second variant of the invention.

FIG. 2 shows this type of accelerometer. The seismic mass 10 is connected to the support 11, which has been leveled off around the seismic mass to simplify the figure, by four struts 12 arranged in opposing pairs. A suitable surface deposit 13 covering the four struts 12 as well as the seismic mass 10 has been applied to compensate for the force of gravity acting on the seismic mass 10.

Figure 3:
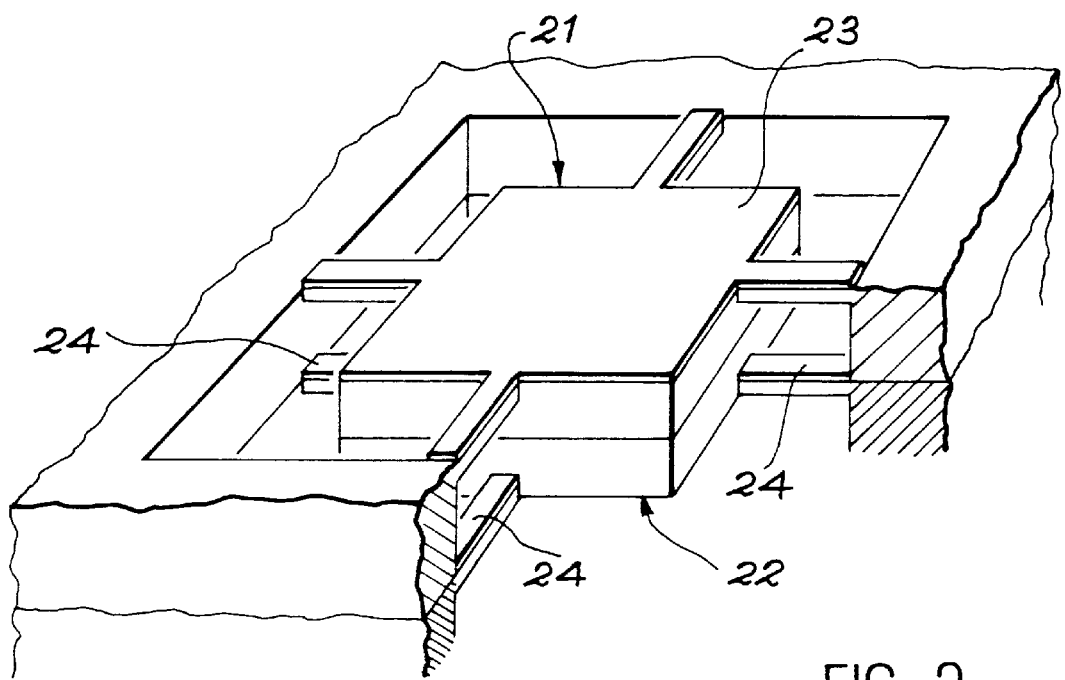
FIG. 3 is a partial perspective view of a gravity-compensation type accelerometer built according to a third variant of the invention.

FIG. 3 is the same type of illustration as FIG. 2 and shows an eight-strut accelerometer. This accelerometer can be obtained by bonding two structures 21 and 22 each having four struts (i.e. both structures are of the type shown in FIG. 2). Bonding may be achieved using known bonding or cementing methods such as, for example, the method described in the article "Application of oxygen plasma processing to silicon direct bonding" by O. Zucker, W. Langheinrich, M. Kulozik and H. Goebel in the review "Sensors and Actuators" A. 36, 1993, pages 227–231.

Since the surface deposits must exert their force to compensate for the force of gravity, deposits 23 and 24 are applied to the surfaces of the struts that will be uppermost once the accelerometer has been assembled.

The planar stresses exerted by the thin layer deposited on the surface of a strut also induce transverse distortion of the strut perpendicular to the direction of the first distortion. The resulting curve accentuates the moment of inertia of the strut and therefore the stiffness of the system, which affects the sensitivity of the sensor. If this phenomenon is found to be potentially too disruptive, it may be remedied in several ways.

Figure 4:
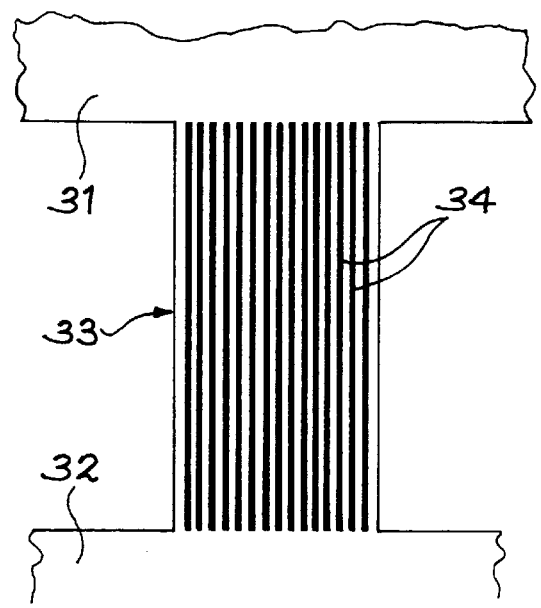
FIG. 4 is a top view of a strut supporting a seismic mass coated with a stress deposit and engraved as an accelerometer according to the invention.

A first solution consists in applying a discontinuous deposit to the strut as shown in FIG. 4, which is a partial top view showing an accelerometer built according to the invention. The seismic mass 31 will be recognized, connected to the support 32 by strut 33. The upper surface of the strut 33 is covered not with a continuous deposit but with parallel lines 34 oriented between the seismic mass and the support 32. It has been shown that in this form the thin film deposited tends to partially free the component from stresses acting perpendicularly to the lines. For more information on this subject, see "Analyse par diffraction des rayons X, de l'évolution des contraintes résiduelles associées à la gravure de lignes dans un dépôt mince de tungstène CVD sur substrat de Si" (Analysis using X-ray diffraction of the development of residual stresses associated with lines engraved in a thin deposit of CVD tungsten on an Si substrate) by L. Maniguet, M. Ignat, M. Dupeux, J.J. Bacmann and P. Normandon in "Revue de Métallurgie-CIT/Science et Génie des Matériaux", September 1993, page 1109.

A second solution consists in using the intrinsic anisotropy of the stresses in certain thin metallic films to orient the maximum force in the most favorable direction, i.e. between the seismic mass and the support. These phenomena of intrinsic anisotropy have been described notably in P. Gergaud and J. J. Bacmann: "Internal stress tensor determination in molybdenum and molybdenum-carbon thin films deposited by D.C. magnetron sputtering" published in "Materials Science Forum" vol. 133–136, 1993, pages 873–878.

Combining these two solutions makes it possible to bring all these phenomena into play and, in some cases, to eliminate the transverse stress.

A third solution consists in making one or more longitudinal slots in the strut, so that the slots run from the seismic mass to the support. Where the means of compensating the force of gravity consist of a surface layer deposited on the strut, the layer is slit, preferably along its entire thickness, using a pattern similar to that shown in FIG. 4.

Surface stress may be exerted by a deposit or processing used to create a stress gradient within the strut. The use of thin films makes it possible to design a two-layer system, i.e. referring to FIG. 1, a thin film 4 and a thin film 5 deposited parallel to one another on either side of the strut. The upper thin film should exert a tensile stress while the lower thin film exerts a compressive stress. Some materials applied in thin films (for example molybdenum) exert opposing types of stress depending on how they are applied. The article "Internal stresses in sputtered chromium" by D. W. Hoffman and J. A. Thornton published in the review "Thin Solid Films", 40 (1977) pages 355–363 describes this phenomenon in the case of chromium.

Moreover, in the field of microelectronics technology, doping techniques are used to obtain compressive or tensile stresses depending on the nature of the element implanted and the conditions under which implanting is carried out. This is discussed in the article "Parallel stress and perpendicular strain depth distributions in [001] silicon amorphized by ion implantation" by R. Fabbri, M. Servidori and A. Zani, published in the review J. Appl. Phys. 66 (10), 15 November 1989, pages 4715–4718. For example, doping with boron produces tensile stresses in silicon while doping with argon produces compressive stresses in the same material.

Where the material used to create the upper thin film (and exerting a tensile force) is the same as that used to create the lower thin film (and exerting a compressive force), the thermal expansion coefficient of the thin films is close, even identical, and the system is thus unaffected by temperature. Where thin films are deposited parallel to one another on either side of the strut, molybdenum is the preferred material. Where thin films are created by doping the material composing the strut (e.g. silicon), even though different dopants are used on the two surfaces, the thermal expansion coefficients of the two layers are very close because the substrate material to which the dopants are applied is identical.

An example of an accelerometer constructed according to the present invention will now be described. The embodiment chosen uses a microelectronics technique to build a four-strut accelerometer of the type shown in FIG. 2. The sensor is made of <100>-orientation silicon. After chemical cleaning, the silicon is covered with a mask which may be a layer of silicon nitride $Si_3N_4$. By using conventional photolithographic processes, an opening of an area delimiting the seismic mass is created in the mask. The silicon is then subjected to an anisotropic engraving process, for example in a bath of potassium hydroxide KOH (see, for example, the article "Development of micromachines silicon accelerometer". cited above). The engraving time must be long enough to produce a thin silicon membrane around the seismic mass.

Figure 5:
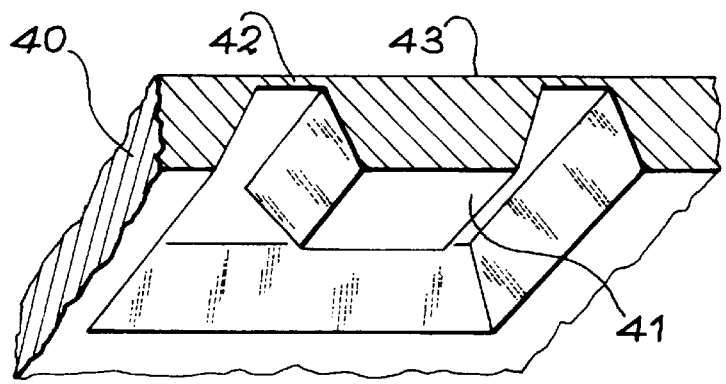
FIG. 5 is a perspective view of an accelerometer according to the invention under construction.

FIG. 5 shows the result obtained on completion of this phase of the process. In this figure, the initial substrate 40 is shown in cross-section. The section cuts through the seismic mass 41 giving an idea of the thickness of the membrane 42 remaining around the seismic mass 41.

Surface 43 of the substrate 40 located on the membrane side is then covered with a layer of silicon oxide $SiO_2$. This coating is again opened so as to demarcate the sides of the struts and the perimeter of the seismic mass. A physical engraving technique (plasma engraving) in a gaseous mixture of boron trichloride $BCl_3$ and chlorine $Cl_2$ is then used to eliminate the silicon from the unmasked areas of the membrane. On completion of this operation the seismic mass stands free of the structure and is only supported by the struts. The remaining layer of silicon oxide is removed by plasma engraving in a gaseous mixture of trifluoromethane $CHF_3$ and oxygen $O_2$.

The stress thin film is then applied using magnetron cathode sputtering. The parameters for creating the molybdenum thin film are regulated to produce tensile stresses in the material.

This type of structure can thus be made of silicon or quartz using the micromachining techniques used in microelectronics. This production method enables a one-piece silicon assembly to be produced (i.e. an assembly in which all the components of the sensor are machined in a solid substrate) with a high quality factor. It is therefore possible to imagine a lower mass and consequently more compact structure.

Where a bimetallic strip type strut is used, the force designed to compensate for the force of gravity is significantly affected by the shape of the strut. The present inventors have found that a bimetallic strip that is rectangular when viewed in the direction of the force of gravity gives less satisfactory compensation for the force of gravity than a triangular shape where the base of the triangle is embedded in the support and where the apex is joined to the seismic mass.

Given the simplicity of producing an accelerometer according to the present invention, series production of the sensors can be contemplated with consequent reduction in cost-price. The invention could be used particularly for making small-size seismometers suitable for use in oil-drilling operations.

We claim:

1. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein in the means for compensating for the force exerted on the seismic mass by gravity consist of a surface layer deposited on the mechanical connecting means, this surface layer being applied to one surface of the mechanical connecting means in such a way that it counteracts the force exerted on the seismic mass by gravity and consisting of a material having the properties necessary to exert a stress on said mechanical connecting means; and wherein the surface deposit is composed of parallel lines oriented between the seismic mass and said support.

2. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein the means for compensating for the force exerted on the seismic mass by gravity consist of a surface layer deposited on the mechanical connecting means, this surface layer being applied to one surface of the mechanical connecting means in such a way that it counteracts the force exerted on the seismic mass by gravity and consisting of a material having the properties necessary to exert a stress on said mechanical connecting means; and wherein the surface deposit has an intrinsic stress anisotropic, the surface deposit being applied to accentuate the direction which the prestress is exerted.

3. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity wherein the mechanical connecting means include at least one component constituting said means of compensation while inducing in the mechanical connecting means a prestress that counteracts the force exerted on the seismic mass by gravity;

wherein the means for compensating for the force exerted on the seismic mass by gravity consist of a surface layer deposited on the mechanical connecting means, this surface layer being applied to one surface of the mechanical connecting means in such a way that it counteracts the force exerted on the seismic mass by gravity and consisting of a material having the properties necessary to exert a stress on said mechanical connecting means; and wherein the surface deposit is split by at least one slot oriented between the seismic mass and said support.

4. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein the means for compensating for the force exerted on the seismic mass by gravity consist of two surface layers on said mechanical connecting means, these surface layers being deposits applied to opposite surfaces of the mechanical connecting means, one of the two deposits consisting of a material that induces a tensile stress and the other deposit inducing a compressive stress, the combination of these two deposits inducing a stress gradient in the thickness of the mechanical connecting means that counteracts the force exerted on the seismic mass by gravity.

5. Accelerometer according to claim 4, wherein the two deposits consist of thin layers of molybdenum applied using different techniques such as to cause them to exert opposing types of stress.

6. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein the means for compensating for the force exerted on the seismic mass by gravity consist of a surface layer deposited on the mechanical connecting means, this surface layer being applied to one surface of the mechanical connecting means in such a way that it counteracts the force exerted on the seismic mass by gravity and consisting of a material having the properties necessary to exert a stress on said mechanical connecting means; and wherein the mechanical connecting means comprise at least one strut whose shape is triangular when viewed in the direction of the force of gravity and where the base of the triangle is embedded in the support and where the apex is joined to the seismic mass.

7. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein means for compensating for the force exerted on the seismic mass by gravity consist of a modification to the surface of the mechanical connecting means, this surface modification inducing said prestress in the mechanical connecting means; and wherein said surface modification consists of surface doping of the material of the mechanical connecting means.

8. Accelerometer according to claim 7, wherein the mechanical connecting means being made of monocrystalline silicon, one of the surfaces of the mechanical connecting means is doped using a dopant selected from the group that includes phosphorus, boron, xenon, titanium, arsenic and argon.

9. Accelerometer according to claim 7, wherein surfacing doping is carried out on opposite surfaces of the mechanical connecting means, each surface being processed with a different dopant, one of which induces a elongation stress while the other induces a compressive stress resulting by inducing a stress gradient in the thickness of the mechanical connecting means that counteracts the force exerted on the seismic mass by gravity.

10. Accelerometer according to claim 9, wherein the mechanical connecting means being made of silicon, one of the surfaces of the mechanical connecting means is doped using boron and the other with argon.

11. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity;

wherein the mechanical connecting means comprise at least one strut; and wherein the seismic mass is supported by at least a series of two struts arranged in opposing pairs in the seismic mass.

12. Accelerometer according to claim 11, wherein the seismic mass is supported by four upper struts arranged in opposing pairs, and by four lower struts arranged in opposing pairs.

13. Accelerometer comprising a seismic mass capable of being subjected to a force induced by the acceleration to be measured, the seismic mass being connected to a support by mechanical connecting means capable of bending under the influence of said force, means of detection being provided to determine the acceleration induced in the seismic mass by the force, means of compensation also being provided to compensate for the force exerted on the seismic mass by gravity, wherein the mechanical connecting means include at least one component constituting said means of compensation while inducing in the mechanical connecting means a prestress that counteracts the force exerted on the seismic mass by gravity wherein the seismic mass, the mechanical connecting means and the support constitute a one-piece assembly.

14. Process for manufacturing an accelerometer comprising a seismic mass connected to a support by mechanical connecting means capable of bending under the effects of a force induced in the seismic mass by an acceleration to be measured, means of compensation also being provided to compensate for the force exerted on the seismic mass by gravity, including the following steps:

masking of one of the main surfaces of a substrate, or first surface, to demarcate the seismic mass and the support, engraving the first surface of the substrate in the direction of the other main surface of the substrate, or second surface, leaving a membrane between the bottom of the engraving and the second surface, this engraving demarcating the seismic mass and the support, masking the second face of the substrate in such a way as to mask the support, the seismic mass and the mechanical connecting means, engraving the second surface of the substrate to open unmasked areas of the membrane, processing at least part of the surface of the mechanical connecting means to induce a prestress counteracting the force exerted on the seismic mass by gravity, thereby constituting said means of compensation.

15. Process according to claim 14, wherein said surface processing consists of a deposit of a material that creates a stress.

16. Process according to claim 14, wherein said surface processing consists of doping.

* * * * *